May 17, 1960 U. VON KRITTER ET AL 2,936,875
ENDLESS BELT TROUGH CONVEYORS
Filed April 24, 1958 6 Sheets-Sheet 3

INVENTORS
ULRICH v. KRITTER
HERBERT KNAUST
By

AGENT

May 17, 1960   U. VON KRITTER ET AL   2,936,875
ENDLESS BELT TROUGH CONVEYORS
Filed April 24, 1958   6 Sheets-Sheet 4
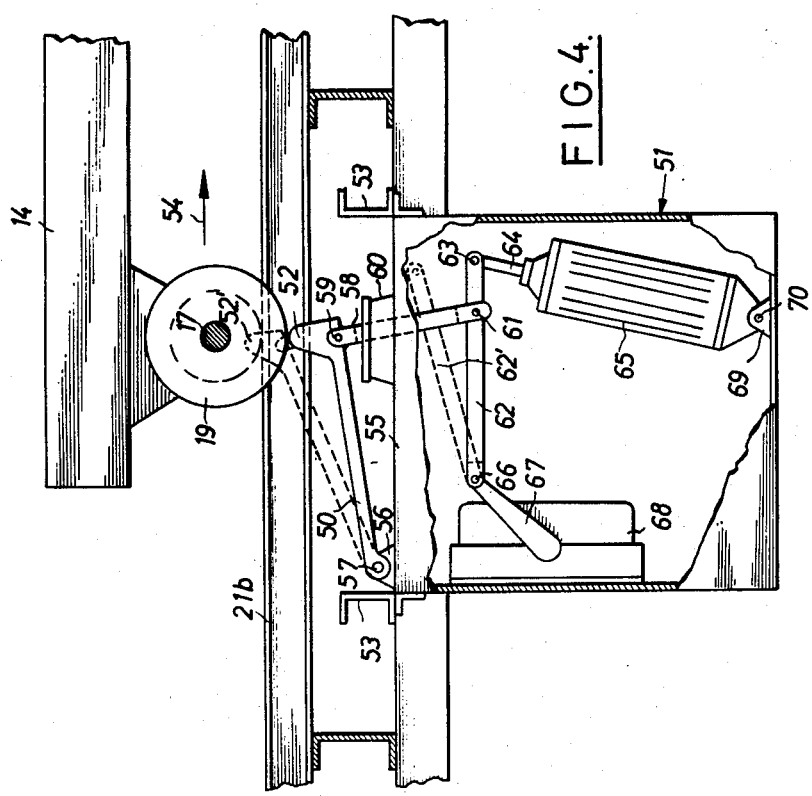
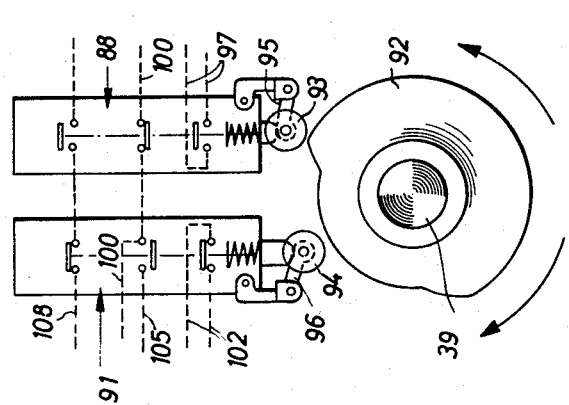
INVENTORS
ULRICH v. KRITTER
HERBERT KNAUST
By
AGENT

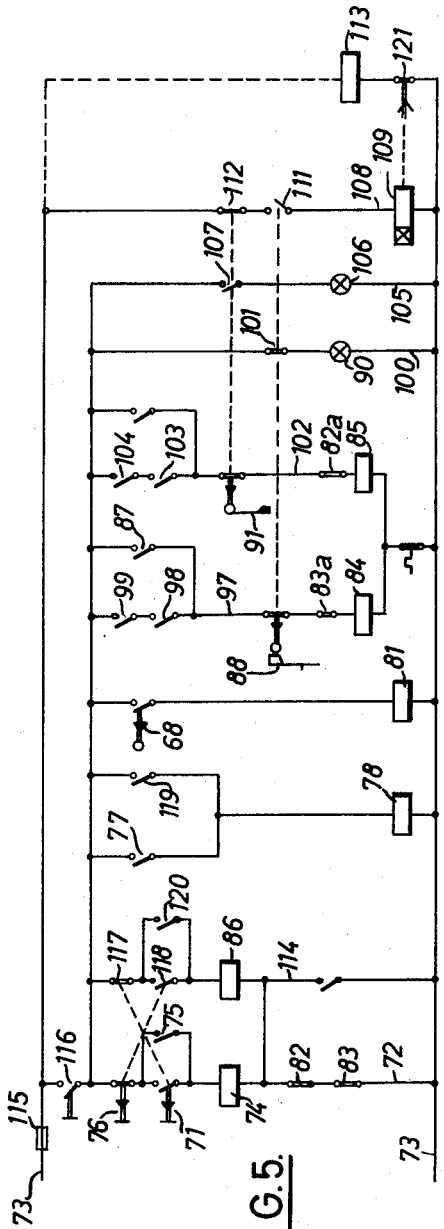
FIG.5.
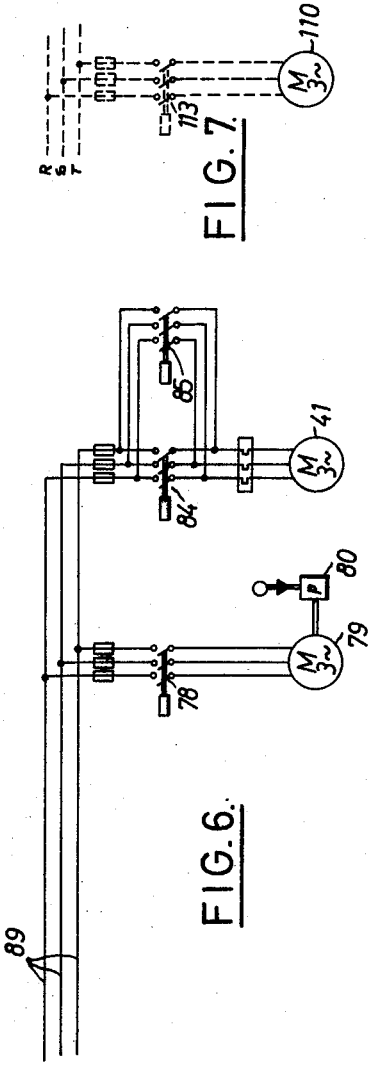
FIG.7.
FIG.6.
INVENTORS
ULRICH v. KRITTER
HERBERT KNAUST
By
AGENT May 17, 1960   U. VON KRITTER ET AL   2,936,875
ENDLESS BELT TROUGH CONVEYORS
Filed April 24, 1958   6 Sheets-Sheet 6
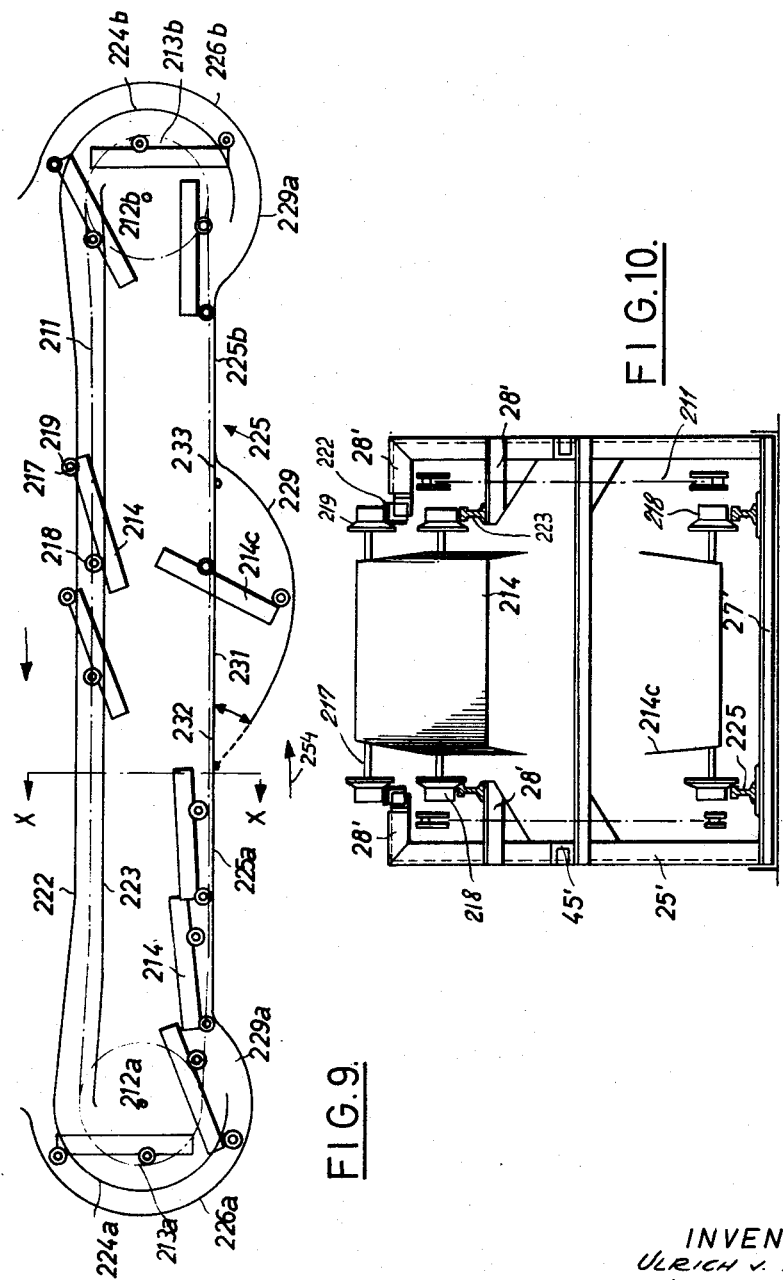
INVENTORS
ULRICH J. KRITTER
HERBERT KNAUST
By
AGENT

United States Patent Office 2,936,875
Patented May 17, 1960

2,936,875
ENDLESS BELT TROUGH CONVEYORS

Ulrich von Kritter and Herbert Knaust,
Bad Homburg vor der Hohe, Germany

Application April 24, 1958, Serial No. 730,708

15 Claims. (Cl. 198—155)

The present invention relates to improvements in endless belt trough conveyors, and more particularly to an endless conveyor comprising at least one dumping station along one of its runs.

Conveyors with dumping stations are known. Such prior devices comprise one or more dumping stations which cannot be bypassed by the troughs and may be used for a discharge only between, but not at the end turns of the conveyor. The fact that the dumping stations cannot be bypassed restricts the field of application of such conveyors, which, therefore, have met with but moderate success.

Accordingly, an important object of the instant invention is to provide an endless conveyor with one or more stations for dumping of powdery, granular or other materials conveyed along the upper or along the lower run of the assembly, which may be bypassed by the conveyor's trough if no dumping of the material intermediate the conveyor's end turns is desired.

Another object of the invention is to provide an automatic control apparatus for actuation of the dumping assembly.

A further object of the invention is to provide a conveyor combined with novel dumping means in such a manner that the unloading process can be carried out at one or more points as desired, the dumping means being adjustable to operate either automatically—in the case of uninterrupted working—in any desired sequence, or manually, in which latter case the operation is interrupted for short periods of time necessary for the adjustment of certain component parts of the dumping assembly.

An additional object of the invention is to provide a dumping system of the above character which is relatively simple in construction and safe in operation, and which may be installed on existing conveyors.

The above and other objects of our invention are attained by the provision of the apparatus comprising a pair of endless flexible elements, preferably endless chains, which move a number of overlapping troughs in an endless path in such a way that the troughs are inverted along one run and in upright position along the other run of the conveyor. Each trough comprises a pair of transverse axles only one of which is connected to the chains. Each axle carries a pair of wheels which, when the troughs are inverted, are guided on two or four rails, respectively, disposed in parallelism with the chain stringers. When the troughs travel in upright position, they rest on the wheels whose axles are not connected with the chains save for the dumping zone where the other set of wheels actively supports the troughs while the latter are being emptied. The length of troughs should be substantially greater than the combined length of a number of chain links.

The dumping station consists of a pair of downwardly arching rails which are abridged by a pair of rail sections and two sets of articulately connected switch tongues. One set of switch tongues is freely pivotable in upward direction and is automatically operated by the wheels of a dumped receptacle. The other set of switch tongues is coupled with manually or automatically operable control devices in such a way that, depending upon the position of tongues, the troughs are led over the arcuate rails to dump their contents into a chute, or may pass over the rail sections above the arcuite rails without dumping the conveyed material.

The dumping stations may be provided along the upper or lower run of the conveyor and are preferably controlled by an electric system which is set in operation by selected wheels of passing receptacles in such manner that the front wheels of each trough continue their travel in a substantially straight line over the dumping station while the rear wheels descend and cause the receptacles to dump their contents which are thereupon led to a desired location.

Other features, advantages and attributes of the improved conveyor will become apparent in the course of the following detailed description of certain embodiments selected for illustration in the accompanying drawings wherein:

Fig. 4 is a greatly enlarged view in partial section of an automatic switch mechanism for operation of switch tongues at the dumping station as seen from line 4—4 in Fig. 3;

Figs. 5 to 7 are diagrams of electric control apparatus for operation of the dumping system;

Fig. 8 is a schematic representation of two limit switches forming part of the control apparatus;

Fig. 9 is a somewhat schematic view in side elevation of a modified conveyor system with a number of dumping stations in the lower run; and Fig. 10 is an enlarged transverse section taken on line X—X of Fig. 9.

Figure 1:
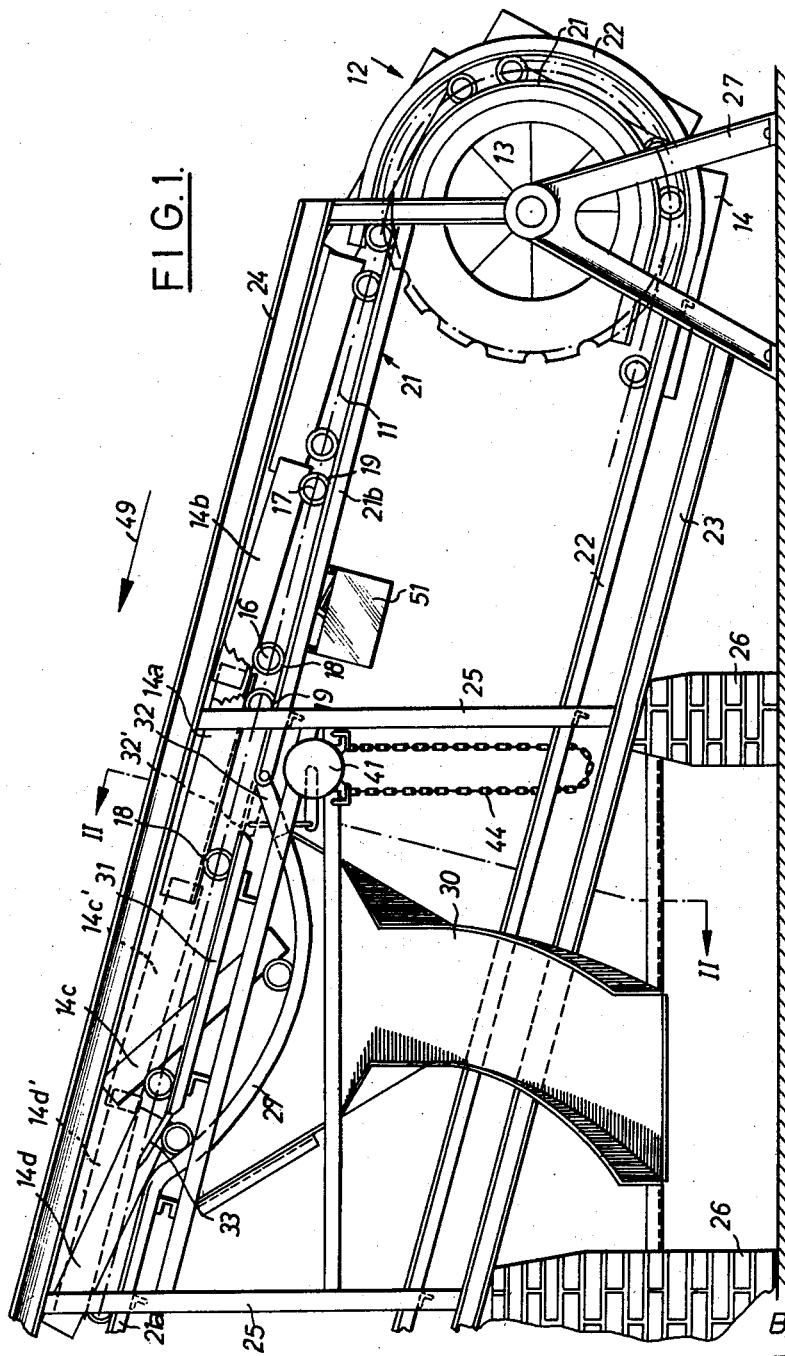
Fig. 1 is a side elevation view of one end of a chain conveyor with upper-run delivery and a dumping station in the latter.

Referring now in detail to the embodiment illustrated in Figs. 1 to 4, the endless belt trough conveyor comprises a pair of spaced chains 11 consisting of chain links 11a and special links 20 (see Fig. 3), which are mounted for travel about sprockets 13 at the end turns 12, one of which is shown at the right-hand end of Fig. 1. Chains 11 support and move in an endless path a plurality of elongated troughs 14 which are so spaced that their longitudinal ends overlap. The length of troughs 14 is greater than the combined length of a number of chain links 11a. Each trough carries at its underside two spaced pairs of bearings 15 rotatably supporting respective transverse axles 16, 17, each axle having mounted adjacent to its longitudinal ends a pair of flanged wheels 18, 19, respectively. The longitudinal ends of axles 16 are extended beyond the wheels 18 and are received in specially shaped chain links 20, thus connecting each trough 14 with both chains 11 of the conveyor system. The other axle 17 of each trough has no connection with the chains and its wheels 19 normally travel on rails 21 and 31 mounted in the area between and parallel with the upper stringers of the chains, or on rails 22 adjacent to the lower stringers.

As above stated, troughs 14 overlap in such a way that the front end of a trailing receptacle overlaps the trailing end of the preceding one. This is best shown in Fig. 1 wherein the skirts, closer to the observer, of troughs 14a, 14b are partly broken away. Such arrangement is necessary because the rear axle 17 of each receptacle descends at a dumping station below the level of the front axle 16 of the adjacent trailing trough which latter thus cannot impede the movements of the leading receptacle. Also, due to such overlap, both ends of each trough rest on wheels 19 which, along the upper run, are at all times fully supported by rail sections 21a, 21b of rails 21, on arcuate rails 29 during dumping, or on bridge rails 31 disposed between rail sections 21a, 21b. Thus, when the dumping station is not in use, the front wheels 18 of each trough do not come into contact with rails 21 and 31.

Rails 21 describe an approximate semicircle adjacent to the teeth of sprockets 13 and extend a short distance along the lower run of the conveyor. Rails 22 are parallel with the lower stringers of chains 11 and describe an approximate semicircle about the sprocket teeth to extend a short distance into the upper run. Thus, the upper and lower rails define a pair of channels for the wheels 18, 19 while the latter travel about the peripheries of sprockets 13, the channels being somewhat wider than the diameters of the wheels. As the troughs 14, after having advanced about the other end turn of the conveyor, reach the lower stringers of chains 11, their wheels 18, 19 roll along the lower rails 22 and the troughs continue their travel in inverted position toward the end turn 12 (see Figs. 1 and 2).

Figure 2:
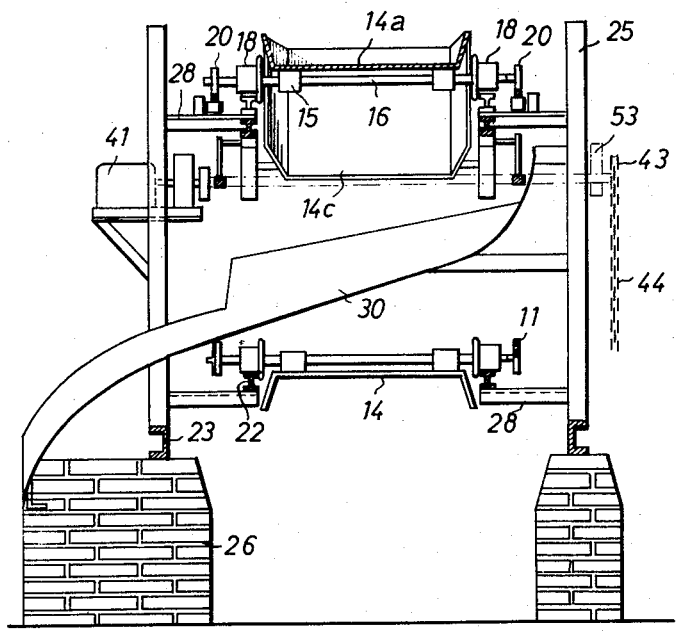
Fig. 2 is a transverse section taken on line II—II of Fig. 1.

Upper and lower rails 21, 22 are supported on short horizontal brackets 28 extending inwardly from vertical profiled columns 25 which, in turn, rest on inclined U-bars 23. Similar bars 24 connect the upper ends of members 25. As shown in Figs. 1 and 2, bars 23 may be supported on brickwork 26, or they may be mounted directly on the ground. At the end turn 12, sprockets 13 are mounted on a common shaft supported in two bearing members 27 of inverted V-shape.

Figure 3:
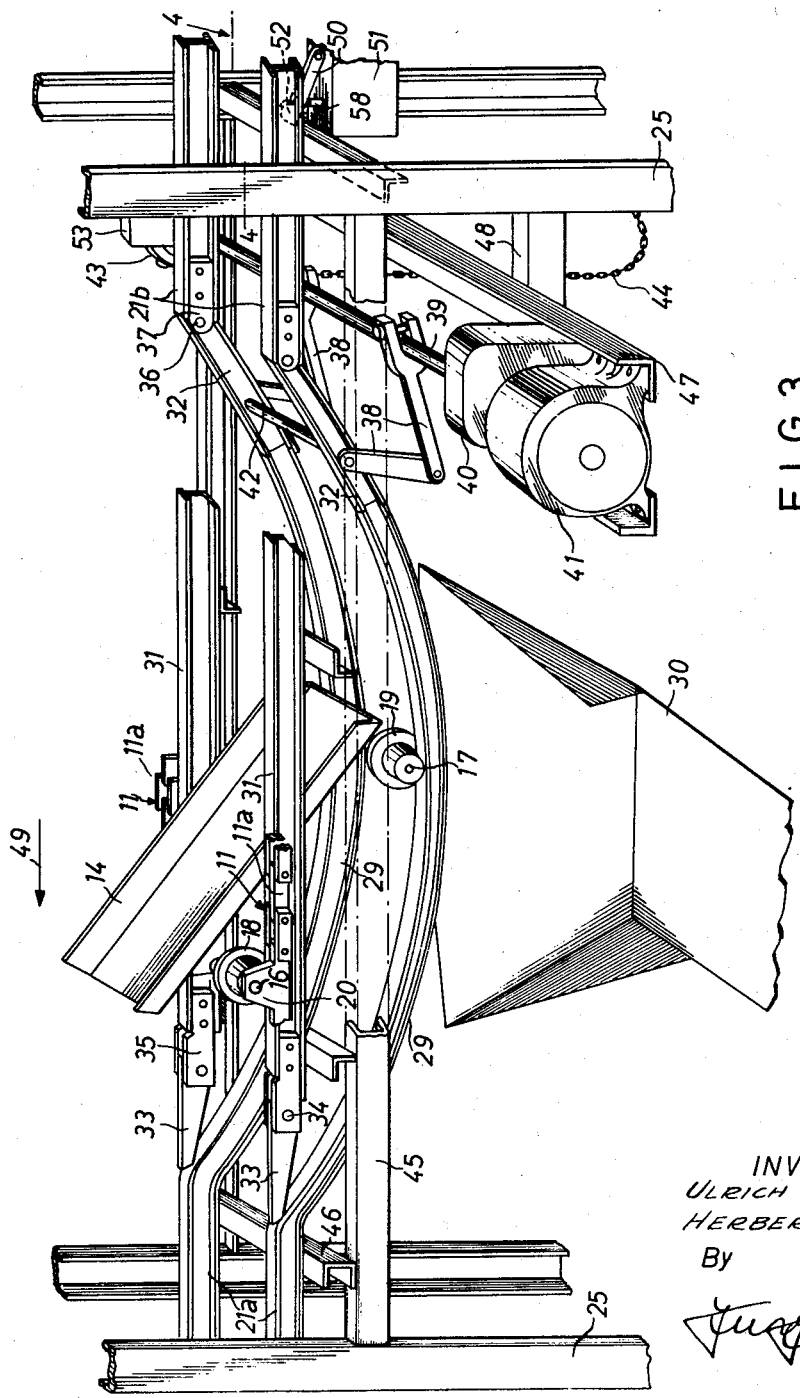
Fig. 3 is an enlarged perspective view of the dumping station.

While only one dumping station is shown in Figs. 1 to 3, there may be provided two or more such stations at certain intervals, depending on the purpose of the conveyor, its length or other requirements.

The dumping station is best shown in Fig. 3. The rear ends of rail sections 21a are connected with a pair of arcuate rails 29, which, as shown, may be integral with and thus form continuations of rail sections 21a at one end of the dumping station. There is a short gap between the free ends of rails 29 and the adjacent front ends of rail sections 21b; this gap may be closed by a pair of switch tongues 32 which thus form a bridge for the passage thereover of wheels 19 when dumping of goods conveyed by the troughs 14 is desired. Alternately, when the dumping station is not used, wheels 19 of the troughs may travel on rail sections 21b, on raised switch tongues 32 which are then in position 32' indicated in phantom lines in Fig. 1, on bridge rails 31, upon a second set of switch tongues 33, and on rail sections 21a to move toward the other end turn of the conveyor system which is not illustrated. An outwardly oriented chute 30 is provided below rails 29 to lead the dumped goods to a desired location.

Switch tongues 33 pivot on short horizontal pins 34 provided in splice strips 35 rigidly connected to the adjacent ends of bridge rails 31, reference being had to Fig. 3 and it being assumed that the troughs 14 travel in the direction of arrow 49. The free ends of tongues 33 rest upon rails 29 and thus form continuations of rail sections 21a. Being pivotable about pins 34, the tongues 33 are lifted by the wheels 19 of a trough, say trough 14c, which is illustrated in dumping position, as the trough continues its travel in the direction of arrow 49. Immediately upon passage of wheels 19 underneath tongues 33 from rails 29 onto rails 21a, the tongues drop by their own weight. A pair of constantly acting springs may be provided to accelerate the return of members 33 into their normal position. Wheels 18 of the next following trough 14a (see Fig. 1) are thus free to continue their travel over tongues 33 and onto rail sections 21a. The gap between rails 31 and rail sections 21a, accordingly, is closed at all times by the tongues 33 save for the short periods when the tongues are lifted by upwardly moving wheels 19 of each dumped trough.

Switch tongues 32 at the right-hand ends of bridge rails 31 are pivotally mounted on horizontal pins 36 received in splice strips 37 which latter are fixed to the adjacent ends of rail sections 21b. These tongues are movable into two positions, namely, for normal travel of troughs 14 on rails 21b, bridge rails 31, tongues 33 and rail sections 21a, or for dumping of their contents when the wheels 19 of each trough travel on rails 29, underneath tongues 33 and on the rail sections 21a. In the first position of elements 32 which is shown in phantom lines at 32' in Fig. 1, they abridge the gap between sections 21b and bridge rails 31. In the second position, i.e. when the contents of troughs 14 should be dumped into chute 30, tongues 32 abridge the gaps between sections 21b and arcuate rails 29. For so moving the tongues, there are provided two pairs of articulately connected links or bell cranks 38 whose free ends are fixed to the ends of a shaft 42 extending between and connected with tongues 32, and to a drive shaft 39, respectively. Drive shaft 39, over a gearing 40, is driven by an electric motor 41 mounted on profiled beams 47 carried by short beams 48 which, in turn, are fixed to an adjacent upright 25. Beams 45 extend between uprights 25 at both ends of the dumping station.

Sprocket 43, keyed to the drive shaft 39 at that side of the conveyor which is distant from motor 41, may be rotated by hand with the help of a chain 44 to move tongues 32 into either of the two positions without assistance of motor 41, if necessary. The rear ends of rail sections 21a are supported on transverse horizontal beams 46 resting on longitudinal carriers 45.

An automatic control system may be coupled with motor 41 to move tongues 32 at such time intervals as are necessary to move them into alignment with rails 29 before the wheels 19 of consecutively moving troughs 14 pass thereover. If more than one dumping station is provided in the upper stringers, the control apparatus will first select those stations which will be put to use without, however, actually moving the tongues 32 into their position shown in Fig. 3. Such movement of these tongues is preferably caused by the troughs 14 themselves in that the operating head 52 of a lever 50, forming part of a switch mechanism 51 and extendable into the path of a wheel 19, is depressed by the latter to cause movement of tongues 32 by means of an operative connection between the mechanism 51 and motor 41, as will be described in greater detail in connection with Figs. 5 to 8.

Switch mechanism 51, with the front wall of its casing partially broken away, is illustrated in Fig. 4. The head 52 of lever 50 is shown in idle position, i.e. below the path of wheel 19. It will be noted that lever 50 and motor 41 (Figs. 1 and 3) are mounted preferably adjacent to the same side of the rail section 21b which in Fig. 1 is closer to the observer's eye.

Trough 14 travels in the direction of arrow 54, its rear axle 17 supporting the wheels 19 which latter, as previously explained, travel on rail sections 21b toward the dumping station.

A bracket 56 is mounted on the lid 55 of switch mechanism 51 and supports a horizontal shaft 57 pivotally mounting one end of the operating lever 50. The other end of this lever, in the proximity of its head 52, is pivotally connected with one end of a push rod 58 by means of a pivot pin 59, the rod 58 extending through a dust trap 60 and lid 55 having its other end connected with a guide rod 62 by means of a pin 61. Pivot pin 61 is connected to member 62 intermediate the longitudinal ends of the latter, these ends being connected, by means of a pin 66, to the free end of actuator arm 67 of the electric switch 68 and, by means of pin 63, with the free end of piston rod 64, respectively. Piston rod 64 extends into an electrohydraulic lifting device 65 whose lower end is pivotally mounted in brackets 69 by means of a pin 70.

Brackets 69 are fixed to the bottom plate of the housing of switch mechanism 51.

When it is desired to lead the troughs 14 over rails 29, i.e. to pivot tongues 32 into their lower position, lifting device 65 is operated by remote control to expel the piston rod 64 and to thus move guide rod 62 into its broken-line position 62'. Push rod 58 follows the upward movement of member 62 and lifts the head 52 of lever 50 into the path of wheel 19. This position of member 52 is shown in broken lines at 52'. Actuator arm 67 of electric switch 68 remains stationary because rod 62 pivots about pin 66 into its phantom-line position 62'. However, as the wheel 19 passes over and depresses the head 52 of lever 50 back into its full-line position, lever 62 pivots about pin 63 and its other end causes angular movement of actuator arm 67 to thus actuate the switch 68 which, being connected with motor 41, causes switch tongues 32 to move into their position shown in full lines in Fig. 3. The electrohydraulic lifting device 65 maintains member 64 in expelled position and, having the freedom of angular movement in brackets 69, pivots slightly about axis 70 to compensate for the movements of the arm 67. Switch 68 contains a resilient element (not shown) which, after the wheel 19 has passed over and past the head 52, immediately returns arm 67 back into its idle position shown in Fig. 4.

Figs. 5 to 8 illustrate schematically the electric control apparatus for automatic operation of the conveyor's dumping station. Tongues 32 are moved into their position of Fig. 3 upon depression of operating knob 71 (see Fig. 5) which, being inserted in line 72, closes the power lines 73 and causes relay 74 to become energized. Closing contact 75 in the holding circuit of relay 74 maintains said relay in energized condition after release of knob 71. As indicated in phantom lines, the connection of knob 71 and of a similar element 76 in line 72 is such that one thereof remains open when the other is depressed and vice versa. Knob 76 controls the return of switch tongues 32 back into horizontal position.

Contact 77 of relay 74 closes and energizes a relay 78 in the circuit of electrohydraulic lifting device 65, shown in Fig. 4, which, in addition to previously described parts, comprises an electric motor 79 coupled with a pump 80 (see Fig. 6). Motor 79 actuates the pump and expels piston rod 64 of the lifting device to move the head 52 of lever 50 into its position 52', as described hereinbefore in connection with Fig. 4. As the wheel 19 of a passing trough 14 moves over and displaces the head 52, switch 68 is actuated by its arm 67 to energize relay 81 (see Fig. 5). Relay 81 performs two functions, to wit: it causes delayed switching off of the lifting device 65, i.e. of the motor 79 and thus also of pump 80 by temporarily shunting serially connected opening contacts 82, 83 of relays 84, 85 respectively, in order to insure subsequent energization of said relays; and it also closes the circuits of relays 84, 85 depending upon which circuit was preselected by the relays 74 and 86. Contact 87 in the holding circuit of relay 84 maintains the relay in energized condition until the limit switch 88 is tripped, which latter thereupon opens the power line 73. Limit switch 88 is mounted in the path of one of tongues 32 at such a point as to be actuated when the tongues are in their lower extreme position, to wit: in alignment with rails 29, or may be actuated by a cam mounted on shaft 39, as will be described in connection with Fig. 8.

As before described, tongues 32 are actually moved by electric motor 41 which is in the circuit 89 of the pump motor 79 and is controlled by relays 84, 85 (see Fig. 6). Contacts 82a, 83a prevent simultaneous energizing of these relays. A signal lamp 90 lights up when the tongues 32 reach their lowermost position, and contact 82 opens the circuit of relay 74 which becomes de-energized as soon as the relay 84 is connected. Thus, the lifting device 65 is disconnected because relay 78, too, is de-energized, and the resilient element in switch 68 returns arm 67 back into its original position together with the lever 50 and its head 52. Thus, the return of lever 50 into idle position is fully automatic.

Tongues 32 remain in line with rails 29 and the contents of all subsequently following troughs 14 are dumped into chute 30 until an impulse is given to the control system to return the tongues into their upper position, i.e. into alignment with bridge rails 31.

Limit switch 88 is shown in greater detail in Fig. 8, together with a similar switch 91, the latter being actuated when the tongues 32 are in their second extreme position, i.e. in line with rails 31. A cam 92 is fixed on the drive shaft 39 of motor 41 to alternately lift the rollers 93, 94 of respective limit switches 88, 91. Rollers 93, 94 are mounted in arms 95, 96 with the latter pivotally attached to suitable brackets connected with the housings of respective members 88, 91. Coil springs in the limit switches constantly urge rollers 93, 94 in a direction toward the cam 92.

Relay 84 controlling the opening contact 83a, as well as the contacts 98, 99 of respective relays 74 and 81 are in the circuit 97 of limit switch 88. Signal lamp 90 which, as above mentioned, indicates the lower extreme position of tongues 32, is in line 100 together with a contact 101 of the limit switch 88. Relay 85, as well as opening contact 82a and both closing contacts 103, 104 are in the circuit 102 of limit switch 91. A second circuit 105 of said element contains the signal light 106 which indicates the uppermost position of tongues 32, and a closing contact 107. In the circuit 108 of limit switches 88 and 91 is a timing relay 109 which controls the connection of motor 110 (see Fig. 7) for actuation of the conveyor chains 11. This motor 110 is disconnected by relay 109 if one or both tongues 32 should become stuck anywhere between their extreme positions. Circuit 108 further comprises the closing contact 111 of limit switch 88 and the opening contact 112 of limit switch 91. Relay switch 113 which controls the chain motor 110, is shown in Figs. 5 and 7.

Knob 76 is actuated when it is desired to lift the tongues 32 into alignment with rails 31. It closes the circuit 114 to permit flow of electric current through a fuse 115, the main switch 116, opening contact 117 of knob 71, over closing contact 118 of knob 76, the relay coil 86, and opening contacts 82, 83 of respective relays 84 and 85 to connect the power lines 73. Relay coil 86 is energized and actuates a closing contact 119 which, over relay 78, connects the lifting device 65 and causes operation of motor 79 and pump 80 (see Fig. 6). Simultaneously, contact 103 is closed preparatory to energization of relay 85 and of closing contact 120, the latter for holding relay 85 in energized state. Thereafter, switch 68 (see Fig. 4) is actuated by the lever 50 depressed upon passage thereover of a wheel 19. Switch 68 energizes relay 81 which latter is shunted in line 114 and, over relay 85 in line 102, starts the motor 41. Motor 41 is now connected in reverse, i.e. to run in such direction as to return the tongues 32 into their upper extreme position. Signal lamp 106 lights up as soon as limit switch 91 indicates that the tongues have completed their upward travel and the motor 41 is then disconnected. Relay 86 is de-energized because the contacts 82 and 83 open, and the lifting device 65 is arrested. Piston rod 64 then returns into its position shown in Fig. 4 causing downward movement of lever 50.

Timing relay 109, as mentioned, is in line 108 in series with limit switches 88, 91 so as to be energized while the tongues 32 are moved in either direction. When, for any reason, tongues 32 remain in an intermediate position, relay 109 opens contact 121 after a set period of time and over relay 113 causes motor 110 to stop. This prevents a derailing of troughs 14.

As is best shown in Fig. 1, the front wheels 18 of trough 14a are already on rails 31 when the switch tongues 32 descend into their lower position indicated in full lines. Thus, while troughs 14a and 14c move over the dumping station, their front wheels are actually in contact with the rails. However, as soon as the front wheels 18 of trough 14c reach switch tongues 33, the front end of receptacle comes to rest in overlapping position upon the rear end of the preceding trough 14d and its front wheels 18 are again lifted above the rail sections 21a.

When the dumping station is not in use, i.e. when the switch tongues 32 are in their phantom-line position 32', troughs 14c and 14d travel thereover onto the bridge rails 31 and over tongues 33 without dumping the conveyed material. Such position of these troughs is shown in Fig. 1 in phantom lines at 14c' and 14d', respectively.

Figs. 9 and 10 illustrate somewhat schematically a modified conveyor in which the receptacles or troughs 214 are inverted along the upper run and convey the goods in the lower run while traveling along the lower stringers of chains 211. The dumping stations are provided along the lower run of the conveyor.

Two pairs of rails 222, 223 are provided on the upper run to serve as supports for respective wheels 219, 218 of the troughs 214 as the latter travel wheels-up along the upper run. Extensions 224a, 224b of rails 222 at the respective end turns 212a, 212b, together with similar arcuate extensions 226a, 226b of the lower rails 225, define a pair of channels for wheels 219 therein as the troughs 214 travel at the end turns about sprockets 213a, 213b. Wheels 219 on axles 217, which are not connected with the chains 211, travel along the upper run on rails 222, thereupon on rails 224a, and while moving about sprockets 213a, transfer onto rails 226a and 229a before reaching the rails 225 adjacent to the lower stringers of the chains where the troughs travel in upright position. On the upper run, wheels 218 are guided by rails 223. On the lower run, wheels 218 are not in contact with rails 225 because, as described in connection with Figs. 1 to 3, the troughs 214 overlap on the straight stretches of rails 225, that is, on their sections 225a, 225b. The distance between arcuate rail sections 224a, 226a and 224b, 226b at the respective end turns 212a, 212b is somewhat greater than the diameters of wheels 219, these wheels traveling in these channels about the sprockets 213a, 213b.

The dumping station in the center of the lower run between rail sections 225a, 225b is identical with that described in connection with Fig. 3. It comprises a pair of bridge rails 231, upwardly pivotable tongues 233, arcuate rails 229 beneath members 231, and tongues 232 which latter, by a control apparatus similar to that described in connection with Figs. 4 to 8, may be moved into alignment with rails 231 and 229, respectively.

Arcuate connecting rail sections 229a, 229b between respective rails 226a, 225a and 225b, 226b cause the troughs, moving in the direction of arrow 254, to assume positions of discharge at both end turns of the conveyor.

It will be noted that the discharge stations in the zones of rails 229a, 229b are permanent and cannot be bypassed as that in the center of the conveyor system. Depending upon the length of the conveyor, more than one dumping station, similar to that in the area of rails 229, may be provided along the lower run of this conveyor.

As shown in Fig. 10, upper rails 222, 223 are supported on brackets 28' extending inwardly from vertical columns 25'. Horizontal beams 45' rigidify the supporting structure and serve as supports for the motors, switches and other parts of actuating and control apparatus. Rails 225 in the lower run of the conveyor are supported on beams 27' or directly on the ground.

While preferred embodiments of our invention have been shown and described hereinabove, we wish it to be understood that changes and modifications may be made therein without departing from the spirit and scope of the invention as defined in the appended claims.

What we claim and desire to protect by Letters Patent is:

1. In a conveyor having an upper run, a lower run and a pair of end turns, in combination: a pair of endless flexible elements disposed in parallel vertical planes between said end turns, each flexible element having an upper and a lower stringer; a pair of sprockets in the planes of said flexible elements at each end turn for driving and deflecting same; a plurality of material conveying troughs mounted for travel in upright position along the lower and in inverted position along the upper run of said conveyor, each trough having a front end and a rear end with the front end of a trailing trough overlapping the trailing end of a preceding trough; each trough further comprising a front and a rear transverse axle fixed to the underside thereof, said front axles being fixed to said flexible elements, and a pair of wheels fixed to each axle; spaced rails adjacent to and parallel with the upper and lower stringers of said flexible elements for guiding the wheels fixed to the rear axles of said troughs, said rails defining at least one pair of spaced gaps in the lower run of said conveyor and each comprising a first section having an end adjacent to one of said gaps, a second section having an end adjacent to the other gap, and a bridge rail between said gaps, the gaps in each of said rails being transversely aligned; an arcuate rail in the vertical plane of and beneath each bridge rail, each arcuate rail having an end connected with the end of the respective first section and another end extending short of and defining a gap with the end of the respective second section; first abridging means connected to each bridge rail adjacent to respective first section for closing the gap therebetween and pivotable in upward direction away from respective first section; second abridging means pivotally connected to the end of each second section; and means for selectively moving said second abridging means into alignment with said bridge rails and said arcuate rails, respectively, the conveyor operating in such manner that, when said second abridging means are aligned with said arcuate rails, the rear wheels of said troughs travel along said section sections, along said arcuate rails whereby the troughs dump the conveyed material, and along said first sections upon pivoting said first abridging means in upward direction.

2. The structure according to claim 1, further comprising a pair of rails adjacent to the upper stringers of said flexible elements for guiding the wheels fixed to the front axles of said troughs.

3. The structure according to claim 2, wherein said first mentioned rails define a channel at each end turn of said conveyor for the passage therethrough of wheels fixed to the rear axles of said troughs.

4. The structure according to claim 3, wherein said first mentioned rails adjacent to the lower stringers of said flexible elements comprise downwardly arching portions adjacent to at least one end turn of the conveyor for deflecting said troughs while the wheels fixed to the rear axles thereof are moved over said downwardly arching portions.

5. In a conveyor having an upper run, a lower run and a pair of end turns, in combination: a pair of endless flexible elements disposed in parallel vertical planes between said end turns, each flexible element having an upper and a lower stringer; a pair of sprockets in the planes of said flexible elements at each end turn for driving and deflecting same; a plurality of material conveying troughs mounted for travel in upright position along the upper and in inverted position along the lower run of said conveyor, each trough having a front end and a rear end with the front end of a trailing trough overlapping the trailing end of a preceding trough; each trough further comprising a front and a rear transverse axle fixed to the underside thereof, said front axles being fixed to said flexible elements, and a pair of wheels fixed to each axle; spaced rails adjacent to and parallel with the upper and lower stringers of said flexible elements for guiding the wheels fixed to the rear axles of said troughs, said rails defining at least one pair of spaced gaps in the upper run of said conveyor and each comprising a first section having an end adjacent to one of said gaps, a second section having an end adjacent to the other gap, and a bridge rail between said gaps, the gaps in each of said rails being transversely aligned; an arcuate rail in the vertical plane of and beneath each bridge rail, each arcuate rail having an end connected with the end of the respective first section and another end extending short of and defining a gap with the end of the respective second section; first abridging means connected to each bridge rail adjacent to respective first section for closing the gap therebetween and pivotable in upward direction away from respective first section; second abridging means pivotally connected to the end of each second section; and means for selectively moving said second abridging means into alignment with said bridge rails and said arcuate rails, respectively, the conveyor operating in such manner that, when said second abridging means are aligned with said arcuate rails, the rear wheels of said troughs travel along said second sections, along said arcuate rails whereby the troughs dump the conveyed material, and along said first sections upon pivoting said first abridging means in upward direction.

6. The conveyor according to claim 5, wherein said rails are disposed between the planes of said flexible elements.

7. In a conveyor having an upper run, a lower run and a pair of end turns, in combination: a pair of endless flexible elements disposed in parallel vertical planes between said end turns, each flexible element having an upper and a lower stringer; a pair of sprockets in the planes of said flexible elements at each end turn for driving and deflecting same; a plurality of material conveying troughs mounted for travel in upright position along one and in inverted position along the other run of said conveyor, each trough having front wheels rotatably fixed to said flexible elements and rear wheels; spaced rails adjacent to and parallel with the upper and lower stringers of said flexible elements for guiding said wheels, said rails defining at least one pair of spaced gaps in that run of said conveyor along which the troughs travel in upright position and each comprising a first section having an end adjacent to one gap, a second section having an end adjacent to the other gap, and a bridge rail between said gaps, the gaps in said rails being transversely aligned; an arcuate rail in the vertical plane of and beneath each bridge rail, each arcuate rail having one end connected with the end of respective first section and another end extending short of and defining a gap with the end of respective second section; first abridging means connected to each bridge rail adjacent to respective first section for closing the gap therebetween and pivotable in upward direction away from respective first section; second abridging means pivotally connected to the end of each second section; motor means; an operative connection between said motor means and each second abridging means for selectively moving the latter into alignment with said bridge rails and said arcuate rails, respectively; and switch means for said motor means comprising actuating means adjacent to one of said second sections and movable into engagement with said troughs to actuate the switch means and to start the motor means whereupon the latter moves said second abridging means into alignment with respective arcuate rails and the rear wheels of said troughs are led over said arcuate rails to incline the troughs and to dump the conveyed material.

8. The structure according to claim 7, wherein said motor means is of the reversible type and said operative connection comprises a driven shaft connected with said motor means and lever means connected with said shaft and with each of said second abridging means.

9. The structure according to claim 7, wherein the distance between the point at which said actuating means engages with said troughs and the end of the respective second section is less than the distance between the rear wheels of two adjacent troughs.

10. The structure according to claim 7, wherein said actuating means is movable into the path of the rear wheels of said troughs, and further comprising lifting means for moving said actuating means into the path of said rear wheels, and means for actuating said lifting means.

11. The structure according to claim 7, wherein said actuating means comprises an articulatable lever extendable into the path of the rear wheels of said troughs whereby said motor means is operated when a rear wheel passes over and articulates said lever.

12. The conveyor according to claim 5, wherein the rails adjacent to the upper stringers of said flexible elements comprise arcuate zones extending about said sprockets into the lower run, and the rails adjacent to the lower stringers of said flexible elements comprise arcuate zones spaced from said first mentioned arcuate zones to define a pair of channels at each end turn of said conveyor, said wheels being led in said channels about said sprockets.

13. The structure according to claim 11, wherein said switch means further comprises a housing for articulately supporting said lever.

14. The structure according to claim 13, wherein said actuating means further comprises a rod articulately connected to said lever and operatively connected with said switch means, the rod extending into said housing and the latter comprising a dust trap through which said rod extends.

15. The structure according to claim 13, further comprising an electrohydraulic lifting device in said housing having a reciprocable rod, means for actuating said lifting device, and means articulately connecting said rod with said switch means and with said lever for moving the latter into the path of said rear wheels when the lifting device is actuated, and for actuating said switch means when a wheel engages said lever.

References Cited in the file of this patent

UNITED STATES PATENTS

| 414,712 | Knapp | Nov. 12, 1889 |
| 2,681,738 | Granath | June 22, 1954 |

FOREIGN PATENTS

| 519,329 | Belgium | May 15, 1953 |